United States Patent
Utecht et al.

(10) Patent No.: US 6,184,310 B1
(45) Date of Patent: Feb. 6, 2001

(54) METHOD FOR PRODUCING POLYMERS CONTAINING CARBAMATE UNITS AND THE USE THEREOF

(75) Inventors: Jens Utecht, Neulussheim; Manfred Niessner, Schifferstadt; Sabine Weiguny, Freinsheim; Primoz Lorencak, Ludwigshafen; Armin Stamm, Mainz, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/355,955

(22) PCT Filed: Feb. 4, 1998

(86) PCT No.: PCT/EP98/00594

§ 371 Date: Aug. 17, 1999

§ 102(e) Date: Aug. 17, 1999

(87) PCT Pub. No.: WO98/35999

PCT Pub. Date: Aug. 20, 1998

(30) Foreign Application Priority Data

Feb. 17, 1997 (DE) .............................. 197 05 992

(51) Int. Cl.[7] .............................. C08G 8/28; C08F 120/58
(52) U.S. Cl. ...................... 525/359.4; 525/509; 524/537; 524/812; 526/304
(58) Field of Search .................... 525/359.4, 509; 524/537, 812; 526/304

(56) References Cited

U.S. PATENT DOCUMENTS

| 3,203,910 | 8/1965 | Wilson . |
|---|---|---|
| 3,597,314 | 8/1971 | Laube et al. . |
| 3,715,336 | 2/1973 | Nowak et al. . |
| 4,255,548 | 3/1981 | Wingard, Jr. et al. . |
| 4,275,002 | 6/1981 | Gless, Jr. et al. . |
| 4,403,072 | 9/1983 | Bunes . |
| 4,421,602 | 12/1983 | Brunnmueller et al. . |
| 4,578,515 | 3/1986 | Dawson et al. . |
| 4,774,285 | 9/1988 | Pfohl et al. . |
| 4,957,977 | 9/1990 | Itagaki et al. . |

FOREIGN PATENT DOCUMENTS

| 14 95 494 | 4/1975 | (DE) . |
|---|---|---|
| 0 216 387 | 4/1987 | (EP) . |
| 0 251 182 | 1/1988 | (EP) . |

OTHER PUBLICATIONS

T. Fischer, et al., Macromol. Chem. Phys., vol. 195, pp. 679–687, "Synthesis of Polyvinylamine and Polymer analogous Reactions", 1994.

Houben–Weyl, Methoden Der Organischen Chemie, vol. E4, pp. 149–192, 1983.

*Primary Examiner*—Tae Yoon
(74) *Attorney, Agent, or Firm*—Oblon, Spivak, McClelland, Maier & Neustadt, P.C.

(57) ABSTRACT

A process for preparing addition polymers which contain carbamate units comprises reacting polyethyleneimines or addition polymers which contain vinylamine units of the formula

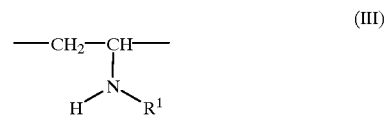

(III)

where $R^1$ is hydrogen or $C_1$–$C_6$-alkyl, with haloformic esters, the carbamate-functionalized polyethyleneimine or vinylamine polymers thus obtainable being useful as retention, drainage and flocculation aids and as fixatives in papermaking, as protective colloids for the preparation of aqueous alkyldiketene dispersions and as dispersants for the preparation of aqueous filler slurries.

12 Claims, No Drawings

METHOD FOR PRODUCING POLYMERS CONTAINING CARBAMATE UNITS AND THE USE THEREOF

DESCRIPTION

The present invention relates to a process for preparing addition polymers which contain carbamate units and to their use as retention, drainage and flocculation aids and as fixatives in paper-making, as protective colloids for the preparation of aqueous alkyldiketene dispersions and as dispersants for the preparation of aqueous filler slurries.

Vinylamine polymers are prepared by polymerizing acyclic N-vinylcarboxamides, preferably N-vinylformamide, and subsequent hydrolysis of the polymers by the action of acids or bases, cf. U.S. Pat. Nos. 4,421,602, 3,597,314, 4,578,515 and 4,255,548. Polyvinylformamides which contain from 10 to 90% of vinylamine units are used, for example according to U.S. Pat. No. 4,421,602, as retention, flocculation and drainage aids in papermaking and as flocculants for sludges.

EP-B-0 216 387 discloses the use of hydrolyzed copolymers of N-vinylformamide, vinyl acetate, vinyl propionate, $C_1$–$C_4$-alkyl vinyl ethers, the esters, nitrites and amides of acrylic acid and methacrylic acid and of N-vinylpyrrolidone in papermaking as paper dry strength enhancers. The comonomers incorporated into the copolymers, such as vinyl esters, esters of acrylic acid and methacrylic acid and the nitrites and amides of these carboxylic acids, can likewise be present in hydrolyzed form, if desired. The preferred dry strength enhancers are copolymers of N-vinylformamide and vinyl acetate, whose monomer units are each 30 to 100 mol % hydrolyzed.

EP-B-0 251 182 discloses copolymers containing N-vinylformamide, vinylamine and acrylonitrile units and optionally small proportions of acrylamide and acrylic acid units. These polymers too are obtainable by copolymerizing N-vinylformamide with acrylonitrile and hydrolyzing the copolymers by the action of acids or bases.

The preparation of modified polyvinylamines is likewise known from the literature. For instance, the reaction of polyvinylamine with aliphatic carbonyl chlorides is described in Macromol. Chem. Phys. 195 (1994), 679. U.S. Pat. No. 4,403,072 and U.S. Pat. No. 4 275 002 disclose the reaction of vinylamine polymers with aromatic sulfonyl chlorides to form the corresponding sulfonamides. The reactions are generally carried out in non-aqueous, polar solvents. For this it is necessary first to isolate the polymers, which were synthesized in aqueous solution, and this is costly.

The reaction of low molecular weight amines with haloformic esters is described in Houben-Weyl, Methoden der organischen Chemie, Georg-Thieme-Verlag Stuttgart, volume E4, 149 ff (1983).

Polyethyleneimines are likewise well known substances. They are prepared for example by polymerizing ethyleneimine in an aqueous medium in the presence of small amounts of acids or acid donors, cf. DE-B-1,495,494.

U.S. Pat. No. 3,715,336 discloses copolymers which contain vinylamine units and vinyl alcohol units, these copolymers being obtainable by polymerization of vinyl isocyanate and vinyl acetate, reaction of the copolymers with a $C_1$–$C_4$ alcohol to form carbamate units and partial or complete hydrolysis of the carbamate units to vinylamine units. The copolymers are used for example as flocculants for aqueous suspensions of finely divided inorganic materials and dispersions of organic substances in water.

It is an object of the present invention to provide a technically simple process for preparing addition polymers which contain carbamate units.

We have found that this object is achieved by a process for preparing addition polymers which contain carbamate units, which comprises reacting polyethyleneimines or addition polymers which contain vinylamine units of the formula

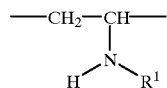

where $R^1$ is hydrogen or $C_1$–$C_6$-alkyl, with haloformic esters.

The resulting carbamate-functionalized polyethyleneimines or vinylamine polymers are used as retention, drainage and flocculation aids and as fixatives in papermaking, as protective colloids for the preparation of aqueous alkyldiketene dispersions and as dispersants for the preparation of aqueous filler slurries.

Polyethyleneimines are known. A process for their preparation was cited above. The process of the invention can be carried out using virtually any polyethyleneimine, but preference is given to water-soluble polyethyleneimines having, for example, molar masses from 200 to 2 million, preferably from 200 to 500,000. Particular preference is given to using polyethyleneimines having molar masses from 500 to 100,000.

Addition polymers containing vinylamine units are likewise known. References describing suitable polymers of this kind were cited above.

Polymers containing vinylamine units can be polymerized for example from open-chain N-vinylcarboxamides of the formula

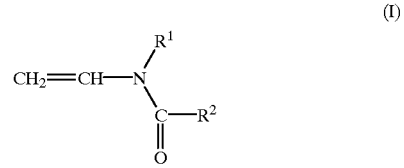

(I)

where $R^1$ and $R^2$ are identical or different and each is hydrogen or $C_1$–$C_6$-alkyl. Examples of suitable monomers are N-vinylformamide ($R^1$=$R^2$=H in the formula I), N-vinyl-N-methylformamide, N-vinylacetamide, N-vinyl-N-methylacetamide, N-vinyl-N-ethylacetamide, N-vinyl-N-methylpropionamide and N-vinylpropionamide. The polymers can be prepared by polymerizing the aforementioned monomers alone, mixed with each other or together with other monoethylenically unsaturated monomers. Homo- or copolymers of N-vinylformamide are preferred as starting material.

Suitable monoethylenically unsaturated monomers for copolymerization with N-vinylcarboxamides include all compounds copolymerizable therewith. Examples thereof are vinyl esters of saturated carboxylic acids of from 1 to 6 carbon atoms such as vinyl formate, vinyl acetate, vinyl propionate and vinyl butyrate. Further suitable comonomers are ethylenically unsaturated $C_3$–$C_6$-carboxylic acids, for example acrylic acid, methacrylic acid, maleic acid, crotonic acid, itaconic acid and vinylacetic acid and also their alkali metal and alkaline earth metal salts, esters, amides and nitriles, for example methyl acrylate, methyl methacrylate, ethyl acrylate and ethyl methacrylate. Further suitable carboxylic esters are derived from glycols or polyalkylene glycols subject to the proviso that only one OH group is esterified in each case, for example hydroxyethyl acrylate, hydroxyethyl methacrylate, hydroxypropyl acrylate, hydroxybutyl acrylate, hydroxypropyl methacrylate, hydroxybutyl methacrylate and also diacrylic monoesters of polyalkylene glycols having a molar mass from 500 to 10,000. Further suitable comonomers are esters of ethylenically unsaturated carboxylic acids with aminoalcohols, for example dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, dimethylaminobutyl acrylate and diethylaminobutyl acrylate. The basic acrylates can be used in the form of the free bases, in the form of the salts with mineral acids such as hydrochloric acid, sulfuric acid or nitric acid, in the form of the salts with organic acids such as formic acid, acetic acid, propionic acid or sulfonic acid or in quaternized form. Examples of suitable quaternizing agents are dimethyl sulfate, diethyl sulfate, methyl chloride, ethyl chloride and benzyl chloride.

Further suitable comonomers are amides of ethylenically unsaturated carboxylic acids such as acrylamide, methacrylamide and also N-alkyl monoamides and -diamides of monoethylenically unsaturated carboxylic acids with alkyl radicals of from 1 to 6 carbon atoms, for example N-methylacrylamide, N,N-dimethylacrylamide, N-methylmethacrylamide, N-ethylacrylamide, N-propylacrylamide and tertbutylacrylamide and also basic (meth)acrylamides, for example dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Further suitable comonomers are N-vinylpyrrolidone, N-vinylcaprolactam, acrylonitrile, methacrylonitrile, N-vinylimidazole and also substituted N-vinylimidazoles, for example N-vinyl-2-methylimidazole, N-vinyl-4-methylimidazole, N-vinyl-5-methylimidazole, N-vinyl-2-ethylimidazole and N-vinylimidazolines such as N-vinylimidazoline, N-vinyl-2-methylimidazoline and N-vinyl-2-ethylimidazoline. N-Vinylimidazoles and N-vinylimidazolines are used not only in the form of the free bases but also after neutralization with mineral acids or organic acids or after quaternization, the quaternization being preferably effected with dimethyl sulfate, diethyl sulfate, methyl chloride or benzyl chloride. Also suitable are diallyldialkylammonium halides, for example diallyldimethylammonium chlorides.

Suitable comonomers also include sulfo-containing monomers such as, for example, vinylsulfonic acid, allylsulfonic acid, methallylsulfonic acid, styrenesulfonic acid, the alkali metal or ammonium salts of these acids or 3-sulfopropyl acrylate.

The vinylamine copolymers also encompass those polymers which additionally contain at least one further monomer in copolymerized form.

To prepare vinylamine polymers it is preferable to start from homopolymers of N-vinylformamide or from copolymers obtainable by copolymerization of N-vinylformamide and vinyl formate, vinyl acetate, vinyl propionate, acrylonitrile or N-vinylpyrrolidone and subsequent hyrolysis of the homo- or copolymers to form vinylamine units from the copolymerized N-vinylformamide units, the degree of hydrolysis being within the range from 0.1 to 100 mol %.

The hydrolysis of the above-described polymers is effected according to known processes by the action of acids, bases or enzymes. This converts the copolymerized monomers of the above-indicated formula I through detachment of the group

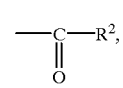

(II)

where $R^2$ is as defined in the formula I, into polymers which contain vinylamine units of the formula

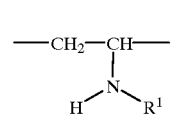

(III)

where $R^1$ is as defined in the formula I. The copolymers which are preparable in this way contain for example from 99 to 1 mol % of N-vinylcarboxamides of the formula I and from 1 to 99 mol % of other, copolymerizable monoethylenically unsaturated monomers in copolymerized form.

The homopolymers of the N-vinylcarboxamides of the formula I and their copolymers can be hydrolyzed to an extent within the range from 0.1 to 100 mol %, preferably to an extent within the range from 10 to 100 mol %. In most cases, the degree of hydrolysis of the homo- and copolymers is within the range from 50 to 90 mol %. The degree of hydrolysis of the homopolymers is synonymous with the vinylamine content of the polymers. In copolymers which contain vinyl esters in copolymerized form, the hydrolysis of the N-vinylformamide units can be accompanied by a hydrolysis of the ester groups with the formation of vinyl alcohol units. This is the case especially when the hydrolysis of the copolymers is carried out in the presence of sodium hydroxide solution. Copolymerized acrylonitrile is likewise chemically modified in the hydrolysis. It is converted, for example, into amide groups or carboxyl groups.

As well as the above-described water-soluble vinylamine copolymers, it is also possible for water-insoluble polymers containing vinylamine units to be reacted by the process of the invention. Water-insoluble vinylamine polymers are obtainable for example by popcorn polymerization of N-vinylcarboxamides, especially N-vinylformamide, or by copolymerization of these monomers in the presence of crosslinkers. Suitable crosslinkers are monomers which contain at least two ethylenically unsaturated double bonds, for example methylenebisacrylamide, divinyldioxane, divinylbenzene, butanediol diacrylate, diacrylates of polyalkylene glycols having, for example, from 2 to 50 alkylene oxide units, preferably ethylene oxide units, N,N'-divinylurea and pentaerythritol triallyl ether. The popcorn polymers and the crosslinked polymers of N-vinylcarboxamides are converted, for example by hydrolysis with bases or acids, into popcorn polymers which contain vinylamine units or into crosslinked copolymers containing vinylamine units. Processes for preparing these polymers are well known. The popcorn polymers are virtually insoluble in all solvents, but can nonetheless be modified by the process of the invention, in the same way as the water-insoluble, but water-swellable crosslinked polymers containing vinylamine units.

The above-described vinylamine polymers and polyethyleneimines are reacted with haloformic esters. Preference is given to using haloformic esters of the formula

where R is an organic radical, for example $C_2$–$C_{28}$-alkyl, phenyl, $C_1$–$C_{28}$-alkylphenyl, $C_4$–$C_8$-cycloalkyl, benzyl or $C_2$–$C_{28}$-alkenyl, and X is halogen. The organic radical can optionally contain functional groups, for example ether, thioether or ester groups. It is likewise possible to use di-, tri- or oligohaloformic esters. X is preferably chlorine. Haloformic esters are known. The preferred chloroformic esters are obtained for example from the corresponding alcohols by reaction with phosgene, diphosgene or triphosgene.

The above-indicated haloformic esters are reacted with vinylamine polymers or polyethyleneimines at temperatures above −20° C. The reaction is preferably carried out in a solvent. Examples of suitable solvents are $C_1$–$C_4$-alcohols, tetrahydrofuran, dioxane, dimethylformamide and water. The reaction is preferably carried out in aqueous solution. The reaction temperatures are for example within the range from −20 to 200° C. and are preferably within the range from 10 to 100° C. The reaction is preferably carried out in aqueous solution at a pH above 5, for example within the range from 8 to 13, especially within the range from 9 to 11. The concentration of the reactants in the aqueous solution or in some other suitable solvent is for example within the range from 1 to 60% by weight, preferably within the range from 10 to 40% by weight. The reaction is very quick. If the reaction is carried out in aqueous solution at above 100° C., the apparatus used is sealed pressuretight.

The reaction products are modified polymers which contain carbamate units of the structures

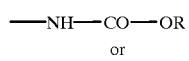

or

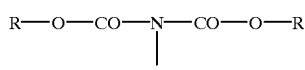

where R is in each case as defined in the formula IV. In the formulae V and VI, R is preferably $C_{10}$–$C_{20}$-alkyl.

The above-indicated polymers can be reacted with the haloformic esters in a weight ratio within the range from 100,000:1 to 1:1, for example. To obtain protective colloids for the preparation of aqueous alkyldiketene dispersions, a relatively slight modification of the contemplated polymers with haloformic esters is sufficient. For instance, reaction products which are obtainable by reaction of polyethyleneimines or of vinylamine polymers with chloroformic esters in a weight ratio within the range from 100,000:1 to 15:1 are used as protective colloids for the preparation of aqueous dispersions of $C_{14}$–$C_{22}$-alkylketene dimers. The resulting aqueous dispersions of alkyldiketene dimers have, for example alkyldiketene concentrations within the range from 10 to 40% by weight, preferably within the range from 15 to 25% by weight. Such dispersions have a relatively low viscosity and are stable in storage.

In most cases, the level of carbamate groups of the structure V is at least 0.1 mol %. The proportion of the NH groups of the polymers which are customarily reacted with haloformic esters in the process of the invention is at least 2 mol %. Preferably, from 5 to 10 mol % of the NH groups of the contemplated polymers are reacted with haloformic esters. However, it is also possible to react all the NH groups of the polymers with haloformic esters to obtain polymers having for example from 1 to 100, preferably from 1 to 10, mol % of units of the formula V. If polyvinylamines prepared by hydrolysis of homopolymers of N-vinylformamide are used in the reaction with haloformic esters of the formula IV, both the hydrogen atoms of the primary amino group can be substituted to obtain polymers containing units of the structure VI. Such units are always present when the polymers have a primary amino group. If partially hydrolyzed N-vinylcarboxamides are used in the reaction of haloformic esters, the polymers obtained contain units of nonhydrolyzed N-vinylcarboxamides as well as units of the structure V and, as the case may be, of the structure VI. If, for example, copolymers of N-vinylformamide and vinyl formate, vinyl acetate or vinyl propionate are used, the copolymers obtained will, depending on the hydrolysis conditions, contain vinylamine and vinylformamide units as well as vinyl formate, vinyl acetate and vinyl propionate units and also the hydrolysis products of these units, namely vinyl alcohol units.

Particular preference is given to polymers which contain amino groups and carbamate functions of the formula V vinylamine units, N-vinylformamide units and vinylcarbamate units of the formula

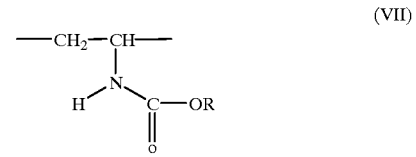

vinylamine units, vinyl alcohol units and units of the formula VII, and vinylamine units, vinyl ester units (derived from vinyl formate, vinyl acetate and/or vinyl propionate) and optionally vinyl alcohol units and units of the formula VII.

The molar mass of the carbamate-functionalized polymers obtainable by the process of the invention is for example within the range from 500 to 50 million (determined by the method of light scattering). The water-soluble polymers have for example K values within the range from 10 to 300, preferably within the range from 30 to 200. The K values are determined by the method of H. Fikentscher in 5% strength aqueous sodium chloride solution at pH 7, 25° C. and a polymer concentration of 0.5% by weight. The carbamate-functionalized polymers are used as retention, drainage and flocculation aids and also as fixatives in papermaking. They are used in the customary amounts for this purpose. They are especially useful as processing aids in the dewatering of paper stocks which contain contraries. Contraries are, for example, ligninsulfonates or other ingredients of wood and humic acids. The carbamate-functionalized polymers to be used according to the invention can be used for making all known paper, paperboard and cardboard grades. The papers can be produced from a multiplicity of different fiber materials, for example from sulfite or sulfate pulp in the bleached or unbleached state, groundwood, pressure groundwoods (PGW), CTMP or waste paper. The retention, drainage and flocculation aids are preferably used in papermaking in amounts from 0.01 to 0.1% by weight, based on the dry fiber materials. The carbamate-functionalized polymers additionally have a good fixing effect in such paper stocks as contain relatively large quantities of contraries; waste paper stocks, for example, contain contrary quantities of resins, polymeric binders and other contrary solids. To fix the contraries on the fibers or in the paper, the carbamate-functionalized polymers, whether water-soluble or water-insoluble, are used for example in amounts from 0.001 to 0.1% by weight, based on dry paper stock.

The carbamate-functionalized polymers are also useful as emulsifiers for preparing aqueous filler slurries which are used for example in the preparation of filled papers. Examples of suitable fillers are clay, chalk, titanium dioxide and kaolin. The quantities of emulsifier to prepare filler slurries range for example from 0.1 to 2, preferably from 0.5 to 1.5, % by weight, based on the aqueous slurry.

In the Examples which follow, parts and percentages are by weight.

The K value of the polymers was determined by the method of H. Fikentscher, Cellulosechemie, 13 (1932) 58–64, 71–74, at 20° C. in 5% aqueous sodium chloride solutions at pH 7 and a polymer concentration of 0.5%; $K=k \times 10^3$.

The complete conversion of the reaction with haloformic esters was confirmed by IR spectroscopy. For instance, the carbamate structures each give rise to two characteristic bands at 1680–1700 and 1540 cm$^{-1}$.

For application testing of the products, sheets were produced in a Rapid-Köthen laboratory sheet former. The dry breaking length was determined as specified in DIN 53112 Sheet 1 and the wet breaking length as specified in DIN 53112 Sheet 2.

EXAMPLE 1

500 g of a 26% strength solution of a polyvinylamine (3018 mmol of vinylamine) having a molar mass of 30,000 g/mol (K value 30) were introduced into a flask and heated to 30° C. with stirring. 70 g of 38% strength hydrochloric acid were added to adjust the aqueous solution to pH 9.5. With continuous stirring, 74 g (783 mmol) of methyl chloroformate were added dropwise over 30 minutes and the reaction mixture was subsequently maintained at this temperature for a further 30 minutes. During the reaction, the pH of the solution was held within the range from 9 to 10 by addition of 4 g of 20% strength aqueous sodium hydroxide solution. The solution was diluted with 200 g of water and adjusted to pH 7 with 130 g of 38% strength hydrochloric acid. This produced 978 g of an aqueous polymer solution having a polymer content of 17.9%. The polymer contains 74 mol % of vinylamine and 26 mol % of methyl N-vinylcarbamate.

EXAMPLE 2

Example 1 was repeated, except that 500 g of a 26% strength aqueous polyvinylamine solution were used with 60 g of 2-ethylhexyl chloroformate (293 mmol), affording 964 g of a polymer solution having a polymer content of 18.6%. The polymer contains 90 mol % of vinylamine and 10 mol % of 2-ethylhexyl N-vinylcarbamate.

EXAMPLE 3

Example 1 was repeated, except that 12 g of cetyl chloroformate (39 mmol), 2 g of 20% strength aqueous sodium hydroxide solution and 176 g of 38% strength hydrochloric acid are used, affording 960 g of polymer solution having a polymer content of 13.4%. The polymer contains 98.7 mol % of vinylamine and 1.3 mol % of cetyl N-vinylcarbamate.

EXAMPLE 4

Example 1 was repeated, except that 14 g of myristyl chloroformate (51 mmol), 2 g of 20% strength aqueous sodium hydroxide solution and 182 g of 38% strength hydrochloric acid were used, affording 968 g of polymer solution having a polymer content of 14.7%. The polymer contains 98.3 mol % of vinylamine and 1.7 mol % of myristyl N-vinylcarbamate.

EXAMPLE 5

500 g of a 9% strength solution (pH 7) of a polyvinylamine (1045 mmol of vinylamine) having a molar mass of 300,000 g/mol (K value 90) were introduced into a flask and heated to 30° C. with stirring. 85 g of 20% strength aqueous sodium hydroxide solution were added to adjust the aqueous solution to pH 9.5. With continuous stirring, 30 g (317 mmol) of methyl chloroformate were added dropwise and the reaction mixture was subsequently maintained at this temperature for a further 30 minutes. During the reaction, the pH of the solution was held within the range from 9 to 10 by addition of 2 g of 20% strength sodium hydroxide solution. The solution was diluted with 200 g of water and adjusted to pH 7 with 125 g of 38% strength hydrochloric acid. This produced 942 g of polymer solution having a polymer content of 6.9%. The polymer contains 69.7 mol % of vinylamine and 30.3 mol % of methyl N-vinylcarbamate.

EXAMPLE 6

Example 5 was repeated, except that 13 g of 2-ethylhexyl chloroformate (64 mmol) and 165 g of 38% strength hydrochloric acid were used, affording 965 g of polymer solution having a polymer content of 5.8%. The polymer contains 93.9 mol % of vinylamine and 6.1 mol % of 2-ethylhexyl N-vinylcarbamate.

EXAMPLE 7

Example 5 was repeated, except that 9 g of myristyl chloroformate (33 mmol) were used, affording 961 g of polymer solution having a polymer content of 5.5%. The polymer contains 96.8 mol % of vinylamine and 3.2 mol % of myristyl N-vinylcarbamate.

EXAMPLE 8

Example 5 was repeated, except that the methyl chloroformate was replaced by 2 g of cetyl chloroformate (6.6 mmol), affording 954 g of polymer solution having a polymer content of 4.9%. The polymer contains 99.4 mol % of vinylamine and 0.6 mol % of cetyl N-vinylcarbamate.

EXAMPLE 9

Example 5 was repeated, except that 4 g of cetyl chloroformate (13.2 mmol) were used, affording 956 g of polymer solution having a polymer content of 5.1%. The polymer contains 98.7 mol % of vinylamine and 1.3 mol % of cetyl N-vinylcarbamate.

Polymer 1 (comparison)

Homopolymer of N-vinylformamide having a K value of 90, from which 100% of the formyl groups were detached by hydrolysis with sodium hydroxide solution. The polymer is present in 14.2% strength aqueous solution.

Polymer 2 (comparison)

Commercially available neutral wet strength enhancer based on a reaction product of epichlorohydrin and a polyamidoamine formed from diethylenetriamine and adipic acid.

Application Examples

Sheets of paper having a basis weight of 80 g/cm² were produced in a Rapid-Köthen sheet former. The paper stock was 50% bleached hardwood sulfite pulp and 50% bleached softwood sulfite pulp having a freeness of 340 SR (Schopper-Riegler) in 0.5% strength aqueous suspension. The pH of the stock suspension was 8.3. The suspension was divided into 6 equal parts, 5 of which were admixed with the polymers indicated in the table under b) to f).

a) The stock suspension contained no further additive.

b)–d) The stock suspension was admixed with 0.5%, based on dry fiber substance, of polymers 7 to 9.

e)–f) The stock suspension was admixed with 0.5%, based on dry fiber substance, of polymers 1 and 2.

The stock suspensions were each dewatered in a Rapid-Köthen sheet former. The sheets obtained therefrom were measured to obtain the dry and wet breaking lengths reported below in Table 1. Examples 10 a, e) and f) are comparative examples, Examples 10 b), c) and d) are examples according to the invention.

TABLE 1

| Example 10 | Polymer obtained according to Example | Wet breaking length [m] | | Dry breaking length [m] |
| --- | --- | --- | --- | --- |
| | | unaged | aged | |
| a) | — | 124 | 126 | 3406 |
| b) | 7 | 593 | 608 | 4051 |
| c) | 8 | 629 | 665 | 4059 |
| d) | 9 | 634 | 670 | 3937 |
| e) | Polymer 1 | 625 | 650 | 3668 |
| f) | Polymer 2 | 630 | 750 | 3879 |

We claim:

1. A process for preparing addition polymers which contain carbamate units, which comprises reacting polyethyleneimines or addition polymers which contain vinylamine units of the formula

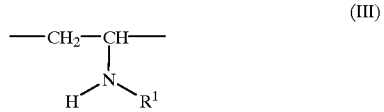

where $R^1$ is hydrogen or $C_1$–$C_6$-alkyl, with haloformic esters.

2. A process as claimed in claim 1, wherein addition polymers containing from 0.1 to 100 mol % of vinylamine units are used.

3. A process as claimed in claim 1, wherein addition polymers containing from 10 to 100 mol % of vinylamine units are used.

4. A process as claimed in claim 1, wherein addition polymers containing from 50 to 90 mol % of vinylamine units are used.

5. A process as claimed in claim 1, wherein the addition polymers used as containing vinylamine units are partially or completely hydrolyzed homopolymers or copolymers of N-vinylformamide.

6. A process as claimed in claim 5, wherein the copolymers used are obtained by copolymerization of N-vinylformamide and vinyl formate, vinyl acetate, vinyl propionate, acrylonitrile and/or N-vinylpyrrolidone and subsequent hydrolysis of the copolymers to form vinylamine units from the copolymerized N-vinylformamide units, the degree of hydrolysis being within the range from 0.1 to 100 mol %.

7. A process as claimed in claim 1, wherein polyethyleneimines having a molar mass from 200 to 500,000 are used.

8. A process as claimed in claim 1, wherein the haloformic esters used have the formula

where

R=is $C_2$–$C_{28}$-alkyl, phenyl, $C_1$–$C_{28}$-alkylphenyl, $C_4$–$C_8$-cycloalkyl, benzyl or $C_2$–$C_{28}$-alkenyl, and X=is halogen.

9. A process as claimed in claim 8, wherein a chloroformic ester is used as compound of the formula IV.

10. A process as claimed in claim 1, wherein the polymers are reacted with the haloformic esters in a weight ratio within the range from 100,000:1 to 1:1.

11. A process as claimed in claim 1, wherein the polymers are reacted with the haloformic esters in such a ratio that from 2 to 100 mol % of the amino groups of the polyethyleneimines or of the vinylamine units of the addition polymers are converted into vinylcarbamate units.

12. A method for forming a protective colloid for the preparation of an aqueous dispersion of $C_{14}$–$C_{22}$-alkylketene dimers comprising adding to said dispersion an addition polymer obtained by reacting a polyethyleneimines or a polymer containing vinylamine units of the formula:

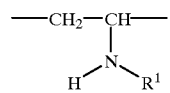

where $R^1$ is hydrogen or $C_1$–$C_2$-alkyl, with a chloroformic ester in a weight ratio within the range from 100,000:1 to 15:1.

* * * * *